United States Patent
Hurle et al.

(10) Patent No.: US 11,898,610 B2
(45) Date of Patent: Feb. 13, 2024

(54) DISCONNECT CLUTCH COMPRISING ADJUSTABLE RETURN SPRING SEAT, DRIVE TRAIN, AND METHOD FOR ADJUSTING THE SPRING FORCE OF A RETURN SPRING OF A DISCONNECT CLUTCH

(71) Applicant: Schaeffler Technologies AG & Co. KG, Herzogenaurach (DE)

(72) Inventors: Thomas Hurle, Bühlertal (DE); Aurelie Keller, Herrlisheim (FR); Ivo Agner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/637,561

(22) PCT Filed: Aug. 20, 2020

(86) PCT No.: PCT/DE2020/100729
§ 371 (c)(1),
(2) Date: Feb. 23, 2022

(87) PCT Pub. No.: WO2021/047715
PCT Pub. Date: Mar. 18, 2021

(65) Prior Publication Data
US 2022/0282758 A1    Sep. 8, 2022

(30) Foreign Application Priority Data
Sep. 10, 2019    (DE) .................. 10 2019 124 192.8

(51) Int. Cl.
*F16D 13/68* (2006.01)
*F16D 25/0638* (2006.01)
(Continued)

(52) U.S. Cl.
CPC ....... *F16D 13/683* (2013.01); *F16D 25/0638* (2013.01); *F16D 13/52* (2013.01);
(Continued)

(58) Field of Classification Search
CPC ............... F16D 13/683; F16D 25/0638; F16D 2013/706; F16D 2021/0669; F16D 2300/14; F16D 13/70; F16D 13/52
See application file for complete search history.

(56) References Cited

U.S. PATENT DOCUMENTS 6,868,949 B2 *   3/2005  Braford, Jr. ........... F16D 25/082
                                                         192/55.61
10,563,707 B2 *  2/2020  Park ........................ F16D 13/52
(Continued)

FOREIGN PATENT DOCUMENTS

| CN | 1120133 A | 4/1996 |
|---|---|---|
| CN | 1737411 A | 2/2006 |

(Continued)

*Primary Examiner* — Jacob S. Scott
*Assistant Examiner* — Farhana Pervin (57) ABSTRACT

A disconnect clutch for a drive train of a motor vehicle includes a torque transfer component with a contact region, an outer disc carrier, an application element, and a return spring. The outer disc carrier is rotationally and axially fixed on the torque transfer component, and arranged for receiving rotationally fixed and axially displaceable friction discs arranged for torque transmission with counter friction discs. The application element is for axially displacing at least one of the friction discs for a frictional connection and the return spring is for releasing the frictional connection. The return spring contacts the application element, the return spring comprises a radially outer portion that bears against the contact region, and the contact region is designed to modify a preload of the return spring.

7 Claims, 7 Drawing Sheets

(51) Int. Cl.
     *F16D 13/70*     (2006.01)
     *F16D 21/06*     (2006.01)
     *F16D 13/52*     (2006.01)
(52) U.S. Cl.
     CPC .............. *F16D 2013/706* (2013.01); *F16D 2021/0669* (2013.01); *F16D 2300/14* (2013.01)

(56) References Cited

U.S. PATENT DOCUMENTS

| | | | |
|---|---|---|---|
| 11,293,497 B2* | 4/2022 | Ebisumoto | .............. F16D 13/38 |
| 2009/0321157 A1 | 12/2009 | Sowul | |
| 2011/0132712 A1* | 6/2011 | Noehl | .................... F16D 21/06 |
| | | | 192/48.601 |
| 2011/0203894 A1* | 8/2011 | Nausieda | ............ F16H 63/3026 |
| | | | 192/70.11 |
| 2012/0152685 A1* | 6/2012 | Phillips | ............... F16D 25/0635 |
| | | | 192/48.5 |
| 2018/0216672 A1 | 8/2018 | Putzer et al. | |

FOREIGN PATENT DOCUMENTS

| | | |
|---|---|---|
| CN | 109562683 A | 4/2019 |
| DE | 112006001432 B4 | 5/2013 |
| DE | 102017130479 A1 | 8/2018 |
| DE | 102017130481 A1 | 8/2018 |
| DE | 102017129278 A1 | 9/2018 |
| DE | 102018129257 A1 | 6/2019 |
| DE | 102018113945 B3 | 9/2019 |
| FR | 3079573 A1 | 10/2019 |
| WO | 2015144161 A1 | 10/2015 |
| WO | 2018054411 A1 | 3/2018 |

* cited by examiner

DISCONNECT CLUTCH COMPRISING ADJUSTABLE RETURN SPRING SEAT, DRIVE TRAIN, AND METHOD FOR ADJUSTING THE SPRING FORCE OF A RETURN SPRING OF A DISCONNECT CLUTCH

CROSS-REFERENCE TO RELATED APPLICATIONS

This application is the United States National Phase of PCT application. No. PCT/DE2020/100729 filed Aug. 20, 2020, which claims priority to German Application No. DE102019124192.8 filed Sep. 10, 2019, the entire disclosures of which are incorporated by reference herein.

TECHNICAL FIELD

The present disclosure relates to a disconnect clutch in the form of a multi-plate clutch or multi-disc clutch, for example as a directly actuated dry (individual) disconnect clutch for a drive train of a motor vehicle. The clutch has an outer disc carrier in which rotationally fixed but axially displaceable friction discs, the outer discs, for example designed as steel discs, can be inserted, which, in full or partial frictional connection with counter friction discs, such as inner discs, for example designed as lining discs, are primed to transfer torque. The outer disc carrier is rotationally and axially fixed, for example by means of a riveting, screwing or welding, on a torque transfer component, such as a hub, and an application element, for example in the form of a pad or lever, is provided to axially displace at least one of the friction discs for a frictional connection. The application element is in contact with a return spring, which is provided to release the frictional connection.

BACKGROUND

Due to the requirements in hybridization, clutch requirements are becoming more stringent in that they must still provide full functionality even at smaller diameters and higher rotational speeds. This applies not only to the torque transmission of the clutch, but also to other components of the clutch. Thus, a small return spring in the clutch with a comparable number of discs, just like a large clutch, must overcome the same air gap/engagement distance.

A minimum force is necessary because this force range is required to overcome a force hysteresis of the engagement system and to meet the dynamic requirements when pushing back the engagement system. However, since the force required for a small clutch in the installed position should not be reduced, but should remain at a similar level, this means that the force edge of the return spring, which is designed as a disc spring, for example, cannot be made as small as desired. However, if the diameter of the force edge were to be kept large, this would exceed the installation space available for modern hybrid arrangements. It may not be possible to meet the rotational speed requirements, which would culminate in a reduced service life. These concerns are particularly aggravated when electric motors are coupled, since high circumferential speeds and high rotational speeds apply in that case.

There are known dual clutch arrangements in which the return spring is located between the pressure pad and the engagement force supporting unit. In this context, reference shall be made, for example, to WO 2015/144161 A1, which discloses a directly actuated dry clutch. This publication discloses, among other things, a friction clutch device having at least one pressure plate and one counterpressure plate, and having at least one leaf spring device which is combined with an adjusting device. It is emphasized that the adjusting device is designed as a tolerance compensation device which enables tolerance compensation of the friction clutch device in its installed position.

It has been shown that fractures frequently occur in return springs.

SUMMARY

In a disconnect clutch of the present disclosure, the return spring lies in a radially outer portion against a contact region of the torque transfer component (directly or indirectly), and the contact region is designed to change the preload of the return spring.

Due to the increased force/displacement load caused by the smaller diameters of the return springs, the mean stresses in the return springs increase. This has an impact on the strength and service life of the spring. Therefore, targeted countermeasures are taken here. Whereas in the case of multi-disc clutches, there has been no force adjustment at all on the return spring when the air gap is set in the past, this is achieved by adjusting the air gap. The usual variants of inserting a shim between an engagement system and a disconnect clutch to compensate for system tolerances also remain possible. As usual, a shim is understood to mean an adjusting disc or tolerance compensation disc. The installation position of the clutch is then expediently adapted to the engagement system. The clutches of the engagement system are thus matched to one another in the overall assembly and the required air gap of the clutch is ensured.

In addition, however, the force that can be invoked by the return spring is now also set. Another variant known in principle regarding the compensation of tolerances, namely the provision of a different friction disc/friction plate/steel disc, e.g., the one closest to an application element, also remains possible. By providing an adjustment option at the radially inner end of the return spring and at the radially outer end of the return spring, an axial tolerance is thus compensated on the one hand and the position of the return spring is adjusted on the other hand. This is useful for directly actuated dry clutches, as the force is set in the installation position. There is also no need for an additional adjustment piece that must be bent to vary the preload in the installed state. This is an advantage over the background of the art, for example WO2015/144 161 A1.

The installation position of the disconnect clutch is fixed with a fixed air gap. By pairing the installation position of the disconnect clutch and the installation position of the engagement system with the aid of "shimming", i.e., inserting a shim at the desired position, the position is ensured on the one hand and the force is adjusted on the other hand by specifically changing the contact region. Depending on the tolerance of the individual parts, this results in a different preload height for the return spring in its installation position and thus also a different force in the installation position of the disconnect clutch, but this is now compensated for. The small spring diameter, the constant minimum force requirement in the installation position, combined with the individual geometric tolerances, no longer leads to a higher load on the return spring, which is beneficial to the service life of the spring. Thus, a possibility has been found to also adjust the force of the return spring after adjusting the air gap. This reduces the force tolerance and thus the travel/working range of the spring and improves the longevity of the spring.

In other words, the two basic adjustment tasks are finally met, on the one hand by using a shim and/or different discs and, on the other hand, by changing the axial bearing of the contact region and thus changing the point of contact at the radially outer end of the return spring, which is designed, for example, as a disc spring.

The support position of the return spring can be plastically deformed. In this way, a tolerance compensation for the force in the installation position of the clutch can be realized. This is possible because the contact cams of the spring are still easily accessible after the clutch has been installed and are designed in such a way that they can be formed with little effort. The focus is thus on changing the preload of a return element according to the set air gap, bending a contact region and/or inserting an element.

In an example embodiment, the contact region is provided by a contact cam projecting radially outward, which is primed for forming displacement during an adjustment process of the spring return force of the return spring or is primed to receive a shim. The position of the return spring thus remains independent of the tolerances and of the shim, which, for example, rests radially on the inside of the return spring. The forming of the contact cam reduces the angle of incidence of the return spring, thus reducing the preload of the return spring relative to the load without, however, falling below the minimum force requirement. The contact cam is thus primed for subsequent plasticizing/aligning. This requires adjustability of the spring force. The spring support area can be designed as a single piece, but can also be realized in several pieces. The spring support is always directly or indirectly connected to the disc carrier.

If the contact region is provided for a contact cam projecting radially outward, which is primed for forming displacement during an adjustment process of the spring return force of the return spring, the position and thus force of the return spring can thus be adjusted quickly and inexpensively by a simple one-way non-cutting machining process. Alternatively, an otherwise common use of shims is also possible at this point, namely if the contact region is primed to receive such a shim. The position of the spring then remains independent of the tolerances and, for example, of the shims resting radially on the inside of the spring.

Furthermore, a wedge may be formed on the surface of the contact cam facing away from the friction disc, which wedge has a ramp leading to a plateau extending in an axial plane, and the axial plane is such a plane through which the axis of rotation of the disconnect clutch extends perpendicularly. The return spring can then be neatly positioned.

In an example embodiment, the contact cam is circumferentially adjacent to two recesses in the material of the torque transfer component designed as a hub. Precise bending of the contact cam, without cracks that would negatively affect the fatigue strength, is then facilitated.

It is also possible to have the recesses aligned with one another at their radially inner ends so that a nominal bending point is specified.

The inner ends of a bending range may predefine the contact cams.

In an example embodiment, the recesses are based on or correspond to the contour of a sock or a child's foot.

The range of variants can be designed to meet customer requirements, for example, if the contact region is designed as a single piece/part or as multiple pieces/parts.

The present disclosure also relates to a drive train of a motor vehicle with a disconnect clutch according to the disclosure when used between two electric motors. Here the targeted reaction to the high rotational speeds and circumferential speeds present in electric motors is beneficial.

The present disclosure also relates to a method for adjusting the spring force of a return spring of a disconnect clutch, for example of the type according to the disclosure, wherein, after the air gap of the disconnect clutch is adjusted, a radially external force transfer region between a torque transfer component and the return spring is moved axially.

Here, the axial movement may be effected before operation by bending a contact cam or by interposing a shim between the contact cam and the return spring.

The present disclosure provides a disconnect clutch possible for use with adjacent components with high circumferential speeds and high rotational speeds, but without having to accept deficits regarding the service life of the individual parts. For example, the installation space may be used more efficiently in a further development.

In a disconnect clutch of this type, the return spring engages through and behind the application element from a side facing away from the friction discs in the direction of the friction discs in order to enter into a form fit with the application element.

Even with high demands on the installation space and difficult geometrical conditions, it is no longer necessary to accept a violation of the installation space contours. It is no longer necessary for the pressure pad to surround the return spring with its feet. In a deviation from the known conventional arrangement, according to the disclosure, the pressure pad does not project beyond the return spring. Rather, the return spring is screwed into the pressure pad with the aid of return feet so that the return spring can be installed as the last and largest part and the return spring can still press back the application element/pressure pad. Thus, the return spring is screwed in behind the application element/the pressure pad with support on the engagement force supporting unit/the hub. The pressure pad therefore does not project beyond the return spring in the axial direction.

The form fit may be achieved on the one hand via the (direct or indirect) contact of an integral section of the return spring with the application element or an integral section of the application element with the return spring or, on the other hand, the form fit may be achieved via the contact of the return spring with an intermediate component, such as a ring, which in turn contacts the application element. If the integral section of the return spring is in contact with the application element or, vice versa, the integral section of the application element is in contact with the return spring, little installation space is needed in the axial direction and few individual components are required. This makes assembly easier and reduces manufacturing costs. A large variability of embodiments and the provision of a modular system is facilitated if the alternative is implemented via the intermediate component.

The integral section may be aligned at least in sections in the circumferential direction. A simple axial pushing together of the individual components with a subsequent screwing in to produce the engagement from behind and a form fit can then be achieved in a similar way to a bayonet lock solution. This facilitates assembly and also makes disassembly possible.

If the application element is designed as a pressure pad or lever and/or the torque transfer component is designed as a hub, suitable standard solutions can be developed and implemented, especially for passenger cars and commercial vehicles. If, in addition or alternatively, the torque transfer component is used to support an engagement force used to cause an axial movement of the pressure pad in effecting the frictional connection, good functionality over time, even under difficult operating conditions, is ensured.

In order to be able to invoke sufficient force from the return spring, the return spring may be in contact with the hub in a predefined radial outer contact region of the hub, e.g., in the region of the pitch circle at which the outer disc carrier is connected to the hub or in a region of the riveting present there.

If the integral section of the return spring is designed as a free hook-shaped end of a radially inwardly projecting flange of the return spring, the form fit between the pressure pad and the return spring can be easily effected during assembly by screwing the return spring in relative to the hub and the pressure pad. An assembly-friendly embodiment results.

A compact embodiment is obtained if, on the one hand, the contact region of the hub with the return spring, a contact region of the pressure pad with the return spring, and the return spring itself, are geometrically designed and, on the other hand, the return spring is designed in terms of its force capacity such that a part of the return spring furthest from the friction disc is arranged on the friction disc side of the section of the pressure pad furthest from the friction disc in all operating states.

To avoid an unintentional start of a disassembly, a rotation lock may be provided for the return spring, e.g., by providing a flank centering. To prevent rotation, it should be noted that one position of the return spring should be secured rotationally after screwing in to prevent the spring from unscrewing. A riveted connection may be used. However, a bending operation can also be used, which acts on a protruding lug/tab. In this context, the rivet not only has the function of securing against unscrewing, but its dual function simultaneously connects the hub to the outer disc carrier. The bolt-like design of the rivet simultaneously centers the spring over the wing recesses. When realizing the transport lock, no further component is necessary either. So-called TwinDrive transmissions can then be implemented expediently.

The rotation lock may be produced by a bolt-like rivet, for example, which rests against radially outer tabs of the return spring or is produced by at least one formed tab of the return spring brought into a form fit with the torque transfer component. Since the lug is a sheet metal section, non-cutting machining, e.g., deep drawing, flanging or bending, is suitable. High cycle times and low scrap rates/minimal waste rates result therefrom.

The rivet may also realize the riveting of the outer disc carrier to the torque transfer component.

The further development also relates to a drive train of a motor vehicle in which a disconnect clutch of the type according to the disclosure is used between two electric motors.

The further development also relates to a method for assembling a disconnect clutch, which may be designed according to the disclosure, wherein a return spring for a friction disc-displacing application element is inserted in a preassembled clutch, e.g., as the last component/component furthest from the friction disc/component lying predominantly on the outside, the application element is inserted in a penetrating manner, is then preloaded and is screwed into direct or indirect contact with the application element, namely in order to enter into a form fit with the latter, for example by means of an engagement from behind.

In other words, the return spring is screwed into the application element/activation element (e.g., designed as a pressure cup or lever) with a form fit. Here, the hook can be present on the return spring or on the application element. As an alternative to screwing in, an additional element could also subsequently support the spring, e.g., if a circlip, a pressed additional part, a riveted additional part or a rivet without additional part were provided. One variant, however, is a flange between the application element and the return spring with a hook on the return spring in combination with the already explained screwing in of the return spring.

This idea is further illustrated by the provision of a form-fitting rotation lock via a rivet or tab, wherein the tab is formable, and flank centering is forced between the rivet and the tab on the one hand and the return spring on the other.

When implementing a riveting rotation lock, a triple function can also be realized, namely in such a way that the rivet connects the outer disc carrier and the hub to one another and implements the rotation lock via flank centering on the return spring. Theoretically, it is also conceivable that this rivet implements an axial fastening on the radially outer side of the return spring. However, a simple contact of the return spring is common.

BRIEF DESCRIPTION OF THE DRAWINGS

The present disclosure is further explained below with the aid of a drawing. In the figures.

The figures are only schematic in nature and serve only for comprehension of the disclosure. The same elements are provided with the same reference signs.

DETAILED DESCRIPTION

Figure 1:
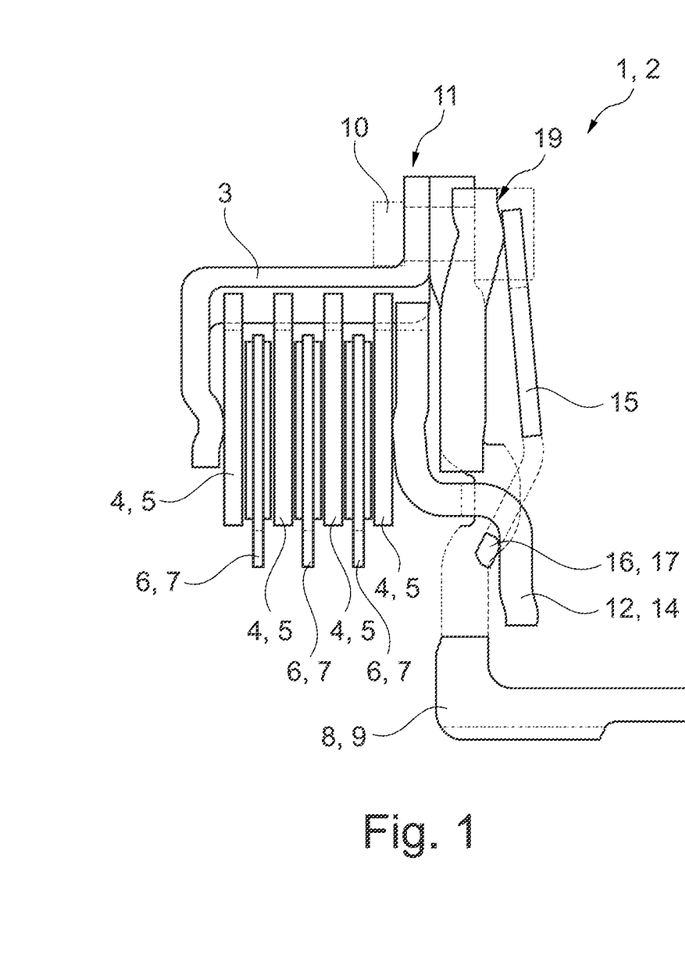
FIG. 1 shows a longitudinal section through a disconnect clutch according to the disclosure.

FIG. 1 shows a first embodiment of a disconnect clutch 1. The disconnect clutch 1 is designed as a multi-disc clutch 2 and has an outer disc carrier 3. The outer disc carrier 3 accommodates friction discs 4, Which are designed as steel discs 5. These interact with counter friction discs 6, which are designed as lining discs 7. The lining discs 7 are rotationally fixed to a coupling component 27 (see FIG. 3), not shown.

If there is a frictional connection between the steel discs 5 and the lining discs 7, torque is transmitted from a torque transfer component 8, which is designed as a hub 9, to the coupling component, since the outer disc carrier 3 is connected to the hub 9 by a rivet, which is only indicated here (see FIG. 1). The rivet has the reference sign 10. It realizes a riveting 11. The frictional connection is created when an application element/activation element 12 acts on the friction disc 4 closest to it, in a pressure-transmitting manner.

Figure 7:
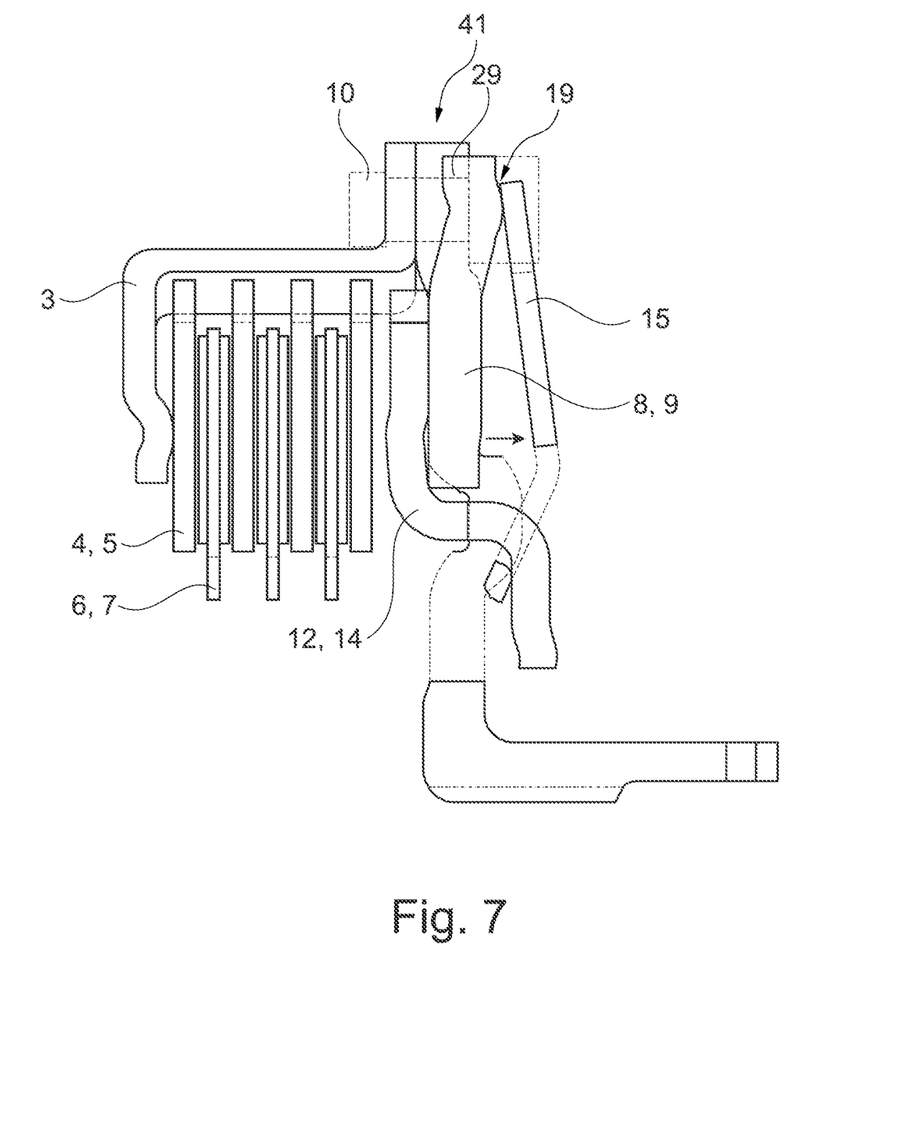
FIG. 7 shows the disconnect clutch of FIG. 1 in a transport state which never exists in operation, wherein, due to the spring property of the return spring, it is in a force-free position in which the pressure cup is pressed against the hub, whereby a transport lock is established and the clutch can be handled as a whole.
Figure 8:
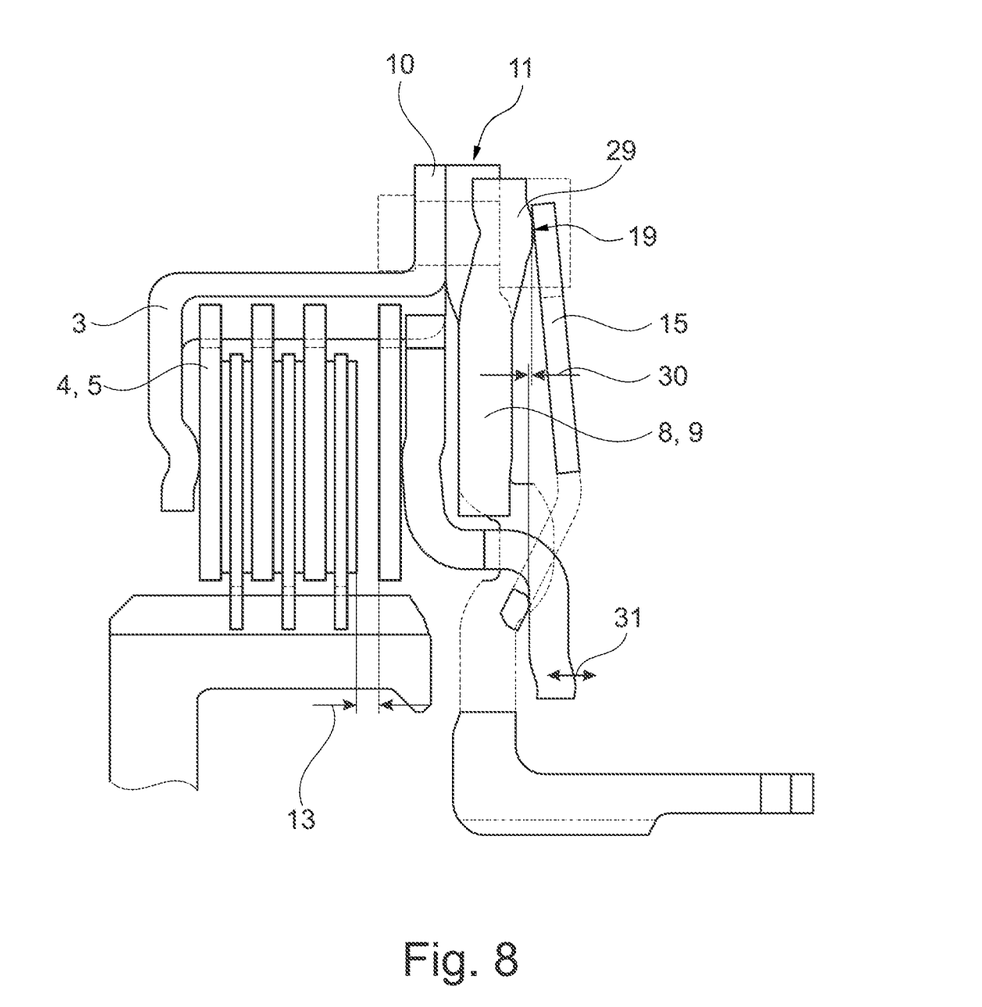
FIG. 8 shows a more detailed longitudinal sectional view of the embodiment of the disconnect clutch of FIG. 1, wherein an air gap to be kept constant is marked as well as an offset/location/position of the return spring kept variable by bending is shown in order to allow tolerance compensation during fine adjustment of the return force.

As soon as an air gap 13, as indicated in FIG. 8, is overcome, a complete or partial frictional connection between the friction discs 4 and the counter friction discs 6 is created for torque transmission. FIG. 1 shows the moment shortly before the frictional connection is attained. The application element 12 can be in the form of a lever or, as shown in the embodiment of FIGS. 1 to 10, can be designed as a pressure pad 14.

A return spring 15 engages through and behind the application element 12. The return spring 15 has an integral section 16, which is present at the radially inner end. This integral section 16 extends at least in sections in the circumferential direction, which can be seen well in FIG. 2. This integral section 16 thus form's a return foot. It could also be said that the integral section 16 forms a hook 17.

Figure 2:
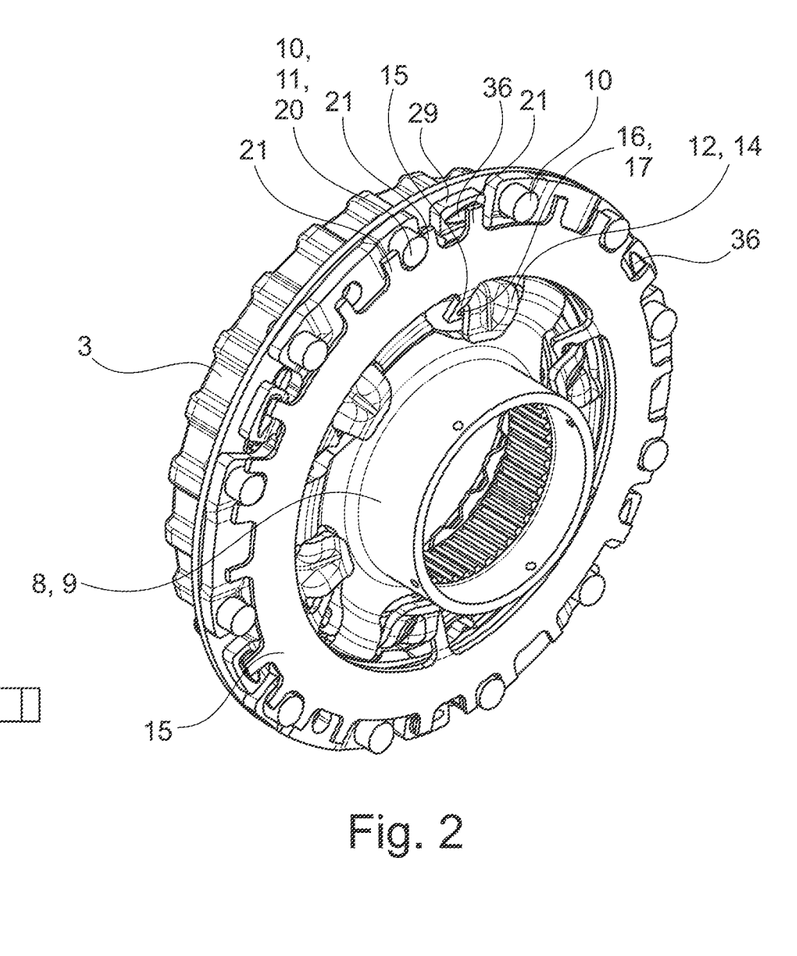
FIG. 2 shows a perspective view of the disconnect clutch of FIG. 1, with the rivet inserted between two tabs of the return spring acting as a rotation lock.

In FIGS. 1 and 2, it can be seen that when the return spring 15 is screwed in/rotated in the circumferential direction after assembly, that hook 17 has come into contact with the pressure pad feet/pressure pad tabs relative to the application element 12/pressure pad 14. An engagement from behind is forced. This effects a form fit between the return spring 15 and the pressure pad 14. The return spring 15 shown in FIG. 1 is already preloaded and rests with its radially outer side against a contact region 19 of the hub 9 in the region of the riveting 11.

However, at least three of the rivets 10 have a special role in that they provide a rotation lock 20 between the return spring 15 and the hub 9. At least three of the rivets 10 engage exactly between two radially outer tabs 21 of the return spring 15 in order to realize a flank centering. In the present embodiment, six such special rivets 10 are used, which entail said flank centering.

Figure 3:
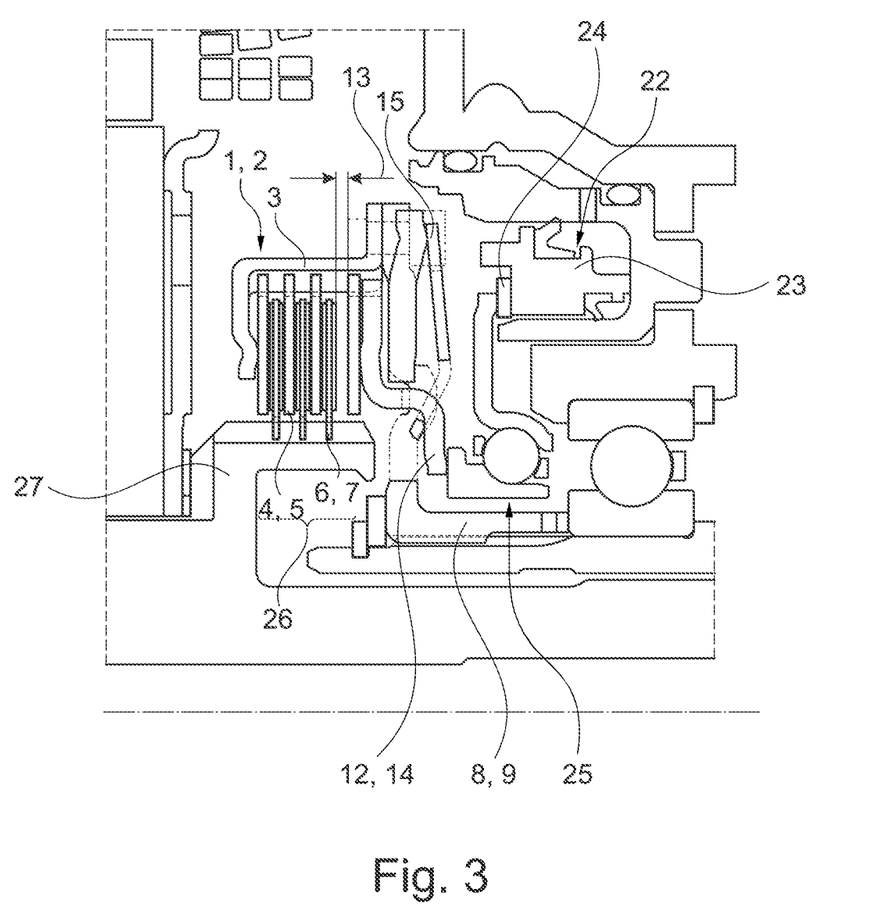
FIG. 3 shows a longitudinal section through a section of a drive train according to the disclosure, in which the embodiment of the disconnect clutch of FIGS. 1 and 2 is inserted.

In addition to the disconnect clutch 1, FIG. 3 also shows a suitable engagement system 22. This engagement system 22 can employ a piston 23 that engages a shim 24 to mate the installation position of the disconnect clutch 1 with the installation position of the engagement system 22. An actuating bearing 25 is axially displaced from the piston 23 via the shim 24, wherein the actuating bearing 25 then engages the application element 12 in an axially displaced manner. If the air gap 13 is then overcome, a stack of discs 26 composed of the friction discs 4 and counter friction discs 6 reaches a state in which it can transmit torque. The air gap 13 is set when the disconnect clutch 1 is in the set state, as shown in FIG. 3.

Figure 4:
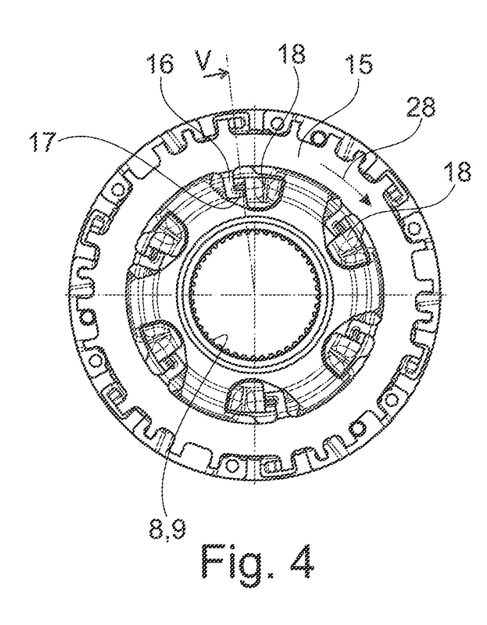
FIG. 4 shows a top view of the disconnect clutch of FIGS. 1 to 3, wherein the return feet of the return springs project into recesses in a hub so that they can be operated through a window and then snapped in behind the pressure cup feet.
Figures 5, 6:
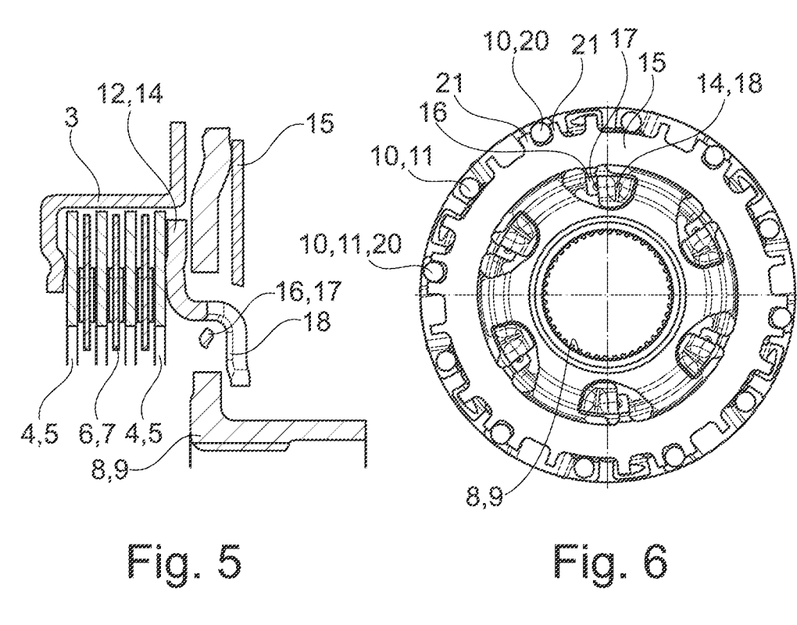
FIG. 5 shows a longitudinal section along the line V of FIG. 4 at the point in time before the return spring is rotated and the engagement from behind/form fit is produced, wherein the return spring is actuated/preloaded to such an extent that the return feet of the return spring can snap in behind the pressure cup.
FIG. 6 shows a point in time during assembly after the assembly times of the FIGS. 4 and 5, at which the disconnect clutch is shown in a similar way to FIG. 4, wherein, however, the position of the return spring is now secured by a rivet after the return spring has been rotated, although a bending operation of a protruding part of a lug would also be available as an alternative.

While in the FIGS. 4 and 5, the return spring 15 is not yet in a form fit, in particular in contact with the pressure pad 14 in the region of the hook 17, in FIG. 6 the return spring 15 is already rotated into its operating position and the hook 17 at the free end of the integral section 16 of the return spring 15 is in engagement from behind with a pressure pad foot/tab 18 of the pressure pad 14. This condition was achieved by rotating the return spring in the direction of arrow 28.

Looking at FIG. 6, it is noticeable that only every second rivet, viewed in the circumferential direction, implements the rotation lock 20, whereas every first rivet 10 only serves to fasten the outer disc carrier 3 to the torque transfer component 8.

In FIG. 7, the pressure pad 14 is in contact with the hub 9. The contact region 19 is provided by a contact cam 29. The state shown in FIG. 7 only occurs before operation, in the transport state, namely when a transport lock is implemented. The return spring 15 then positions such that the pressure pad 14 rests against the hub 9. However, it is not completely powerless even in this state. In operation, however, no contact of the pressure pad 14 with the hub 9 should occur, which is why the preload of the return spring 15 should be skillfully selected in advance. For this purpose, it is recommended that the force of the return spring be adjustable after setting the air gap 13. The distances are selected such that the return spring 15 is always under preload, even in the transport state.

In FIG. 8, as already explained, the air gap 13 to be kept constant is visualized, wherein, however, a bending of the contact cam 29 by a bending distance 30 covered during the adjustment is shown to illustrate the necessity of a positional alignment of the return spring 15. The contact cam 29 can be integral with the torque transmitting member 8 as a single piece or can be attached thereto as a separate part.

In addition, the axial position of the contact cam 29 itself can be changed during the adjustment process in the case of a single-piece design, or the axial position of a displacement part attached to the hub can be changed in the case of a multi-part design.

Figure 9:
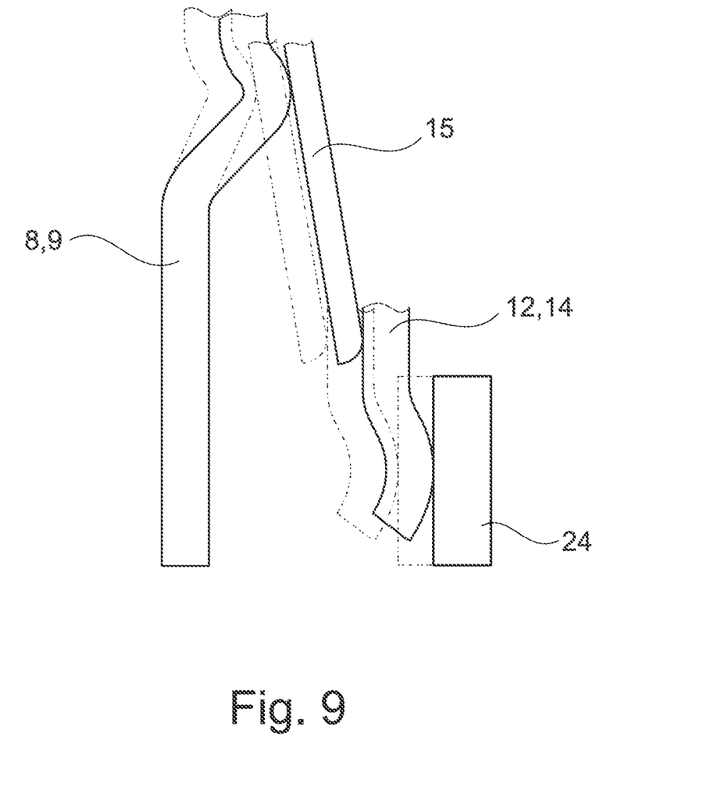
FIG. 9 shows a section of FIG. 8 on a respective section of the hub, the return spring of the pressure pad and a shim at the time before the return spring force is set and after the return spring position has been set, wherein bending of the contact cam prevents excessive loading of the return spring during operation, but without then falling below the required minimum force, the undirected height corresponds to the maximum tolerance position, thus ensuring that bending can only ever take place in one direction, and the same force conditions always act on the return spring, i.e., the same spring load is always present.

This bending distance 30 allows the return spring 15 to be adjusted after shims 24 have been used (see FIG. 9). By bending, a narrowed tolerance in relation to the return force is achieved here. A height difference 31 is achieved by using shims 24, i.e., by effecting a "shimming". Tolerances are thus compensated.

Figure 10:
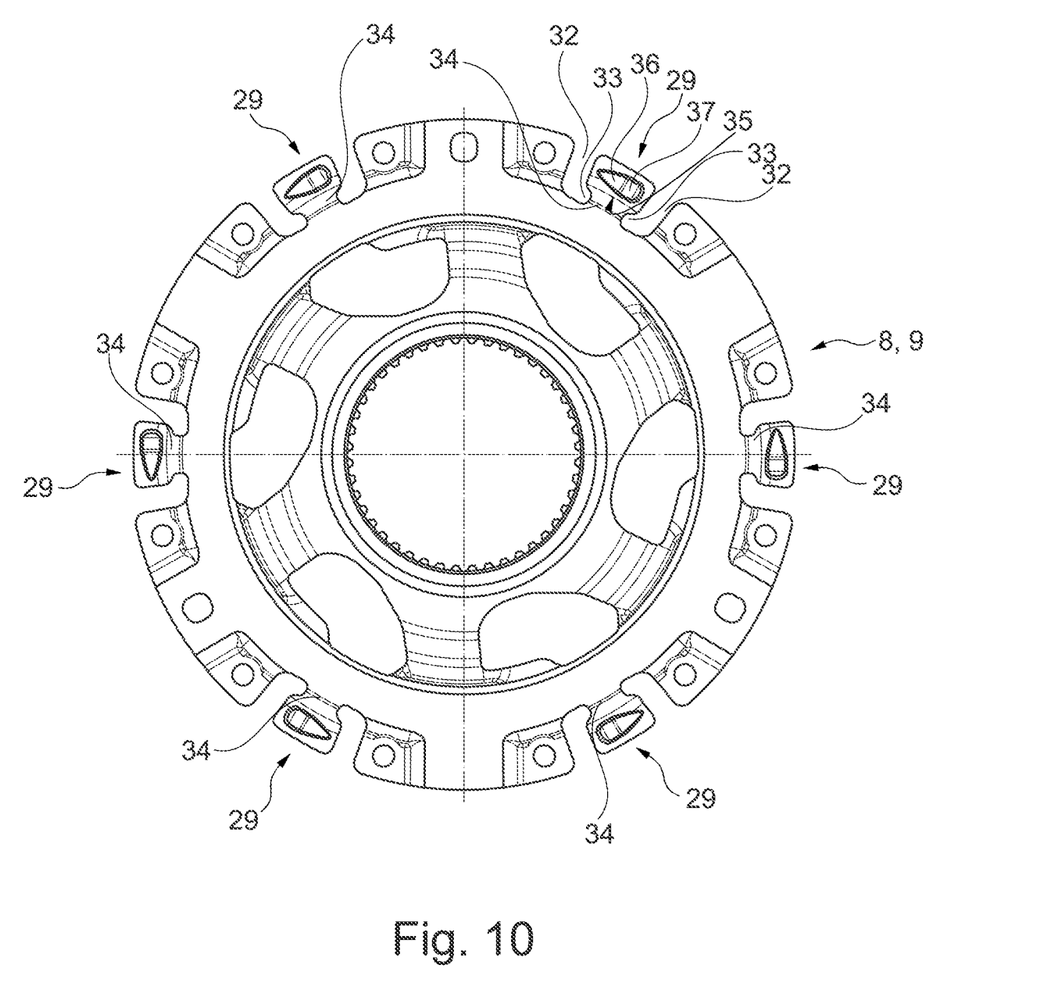
FIG. 10 shows a top view of the torque transfer component designed as a hub and an exposed contact cam for subsequent plasticizing/straightening of the spring force.

In the singular illustration of hub 9 in FIG. 10, the presence of six exposed contact cams 29 can be seen. Each contact cam 29 is delimited by two recesses 32. Inner ends of two recesses 32, adjacent to a contact cam 29, run toward one another. They define a bending range 34. If a die moves onto the contact cam 29 after performing the "shimming", i.e., compensating for axial offsets caused by tolerances, bending can be forced in one direction to effect a position correction on the return spring 15. For screwing the return spring 15 into its end position, it is advantageous to have a wedge on the contact cam 29, which has a ramp 36 that transitions into a plateau 37. This is beneficial regarding the precision of the clutch, since the lug 21 of the return spring 15 comes into contact precisely on the plateau 37 in order to determine the axial position exactly.

REFERENCE NUMERALS

1 Disconnect clutch
2 Multi-disc clutch
3 Outer disc carrier
4 Friction disc
5 Steel disc
6 Counter friction disc
7 Lining disc
8 Torque transfer component
9 Hub
10 Rivet
11 Riveting
12 Application element/Activation element
13 Air gap
14 Pressure pad
15 Return spring
16 Integral section
17 Hook
18 Pressure pad foot/pressure pad tab
19 Contact region
20 Rotation lock
21 Tab
22 Engagement system
23 Piston
74 Shim
25 Actuating bearing
26 Stack of discs
27 Coupling component
28 Direction of rotation
29 Contact cam
30 Bending distance
31 Height difference
32 Recess
33 Inner end
34 Bending range
35 Wedge
36 Ramp
37 Plateau

The invention claimed is:

1. A disconnect clutch for a drive train of a motor vehicle, comprising:
a torque transfer component comprising a contact region;
an outer disc carrier:
rotationally and axially fixed on the torque transfer component; and
arranged for receiving rotationally fixed and axially displaceable friction discs arranged for torque transmission with counter friction discs;
an application element for axially displacing at least one of the friction discs for a frictional connection; and
a return spring for releasing the frictional connection, wherein:
the return spring contacts the application element;
the return spring comprises a radially outer portion that bears against the contact region;
the contact region is arranged to modify a preload of the return spring; and
the contact region is provided by a radially outwardly projecting contact cam that is arranged for a forming displacement during an adjustment process of a return force of the return spring.

2. The disconnect clutch of claim 1, wherein:
a wedge is formed on a surface of the contact cam facing away from the friction disc; and
the wedge comprises a ramp leading to a plateau extending in an axial plane.

3. The disconnect clutch of claim 1, wherein:
the torque transfer component is a hub;
the hub comprises a recess; and
the contact cam is circumferentially adjacent to the recess.

4. The disconnect clutch of claim 3, wherein:
the hub comprises a plurality of recesses with respective radially inner ends; and
the plurality of recesses are aligned with one another at their radially inner ends.

5. The disconnect clutch of claim 4 wherein the radially inner ends predefine a bending range of the contact cam.

6. The disconnect clutch of claim 1, wherein the contact region is formed as a single piece or formed in multiple pieces.

7. A drive train of a motor vehicle comprising:
a pair of electric motors; and
the disconnect clutch of claim 1 arranged between the pair of electric motors.

\* \* \* \* \*